United States Patent
Chen et al.

(10) Patent No.: US 11,983,090 B2
(45) Date of Patent: May 14, 2024

(54) SETTING BREAKPOINTS FOR SOURCE CODE SEGMENTS ENCLOSED BY MACROS

(71) Applicant: International Business Machines Corporation, Armonk, NY (US)

(72) Inventors: Xiao Ling Chen, Beijing (CN); Wen Ji Huang, Beijing (CN); Heng Wang, Beijing (CN); Sheng Shuang Li, Beijing (CN); Wen Bin Han, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/674,151

(22) Filed: Feb. 17, 2022

(65) Prior Publication Data
US 2023/0259444 A1   Aug. 17, 2023

(51) Int. Cl.
*G06F 9/44* (2018.01)
*G06F 8/41* (2018.01)
*G06F 11/36* (2006.01)

(52) U.S. Cl.
CPC ............ *G06F 11/3604* (2013.01); *G06F 8/44* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 8,219,980 B2* | 7/2012 | Bates | G06F 11/3612 717/124 |
| 2004/0059960 A1 | 3/2004 | Jentsch et al. | |
| 2004/0221262 A1 | 11/2004 | Hampapuram et al. | |
| 2004/0268327 A1* | 12/2004 | Burger | G06F 8/20 717/140 |
| 2005/0210335 A1* | 9/2005 | Muratori | G06F 11/362 714/E11.207 |
| 2007/0011669 A1 | 1/2007 | Varma et al. | |
| 2008/0276226 A1* | 11/2008 | Farchi | G06F 11/3644 717/129 |
| 2010/0169867 A1* | 7/2010 | Wegmann | G06F 11/3664 717/129 |

(Continued)

OTHER PUBLICATIONS

GDB; The GNU Project Debugger; retrieved from www.sourceware.org/gbd on Feb. 17, 2022; 4 pages.

(Continued)

*Primary Examiner* — Qamrun Nahar
(74) *Attorney, Agent, or Firm* — CANTOR COLBURN LLP; Eric Chesley

(57) ABSTRACT

A method of analyzing source code includes receiving, by a processor, an updated version of a computer program, the updated version including a source code. The method also includes preprocessing, by a compiler, the source code for a target computing platform. Preprocessing the source code by the compiler includes identifying a macro condition associated with one or more computer instructions enclosed by a macro, determining object code corresponding to the one or more computer instructions based on a current value of the macro condition, and generating object code and macro information for output to a debugger, the macro information including one or more breakpoint conditions in the macro.

15 Claims, 13 Drawing Sheets

(56) References Cited

U.S. PATENT DOCUMENTS

| | | |
|---|---|---|
| 2013/0159982 A1* | 6/2013 | Lerios .................... G06F 8/433 |
| | | 717/146 |
| 2013/0290928 A1 | 10/2013 | Johnson |
| 2015/0033202 A1 | 1/2015 | Wilson et al. |
| 2016/0062753 A1 | 3/2016 | Chanpagne |
| 2017/0161062 A1 | 6/2017 | Banerjee et al. |
| 2020/0192662 A1 | 6/2020 | Hu |

OTHER PUBLICATIONS

John P. Woods; A framework for the assessment of knowledge transfer in software development organizations; Massachusetts Institute of Technology; 2001; 85 pages.

Method to enable macros debugging; IP.com PAD; Dec. 1, 2021; 2 pages.

Ryan Culpepper et al.; Debugging Macros; GPCE '07; Oct. 2007; 10 pages.

* cited by examiner

Figure 3A:
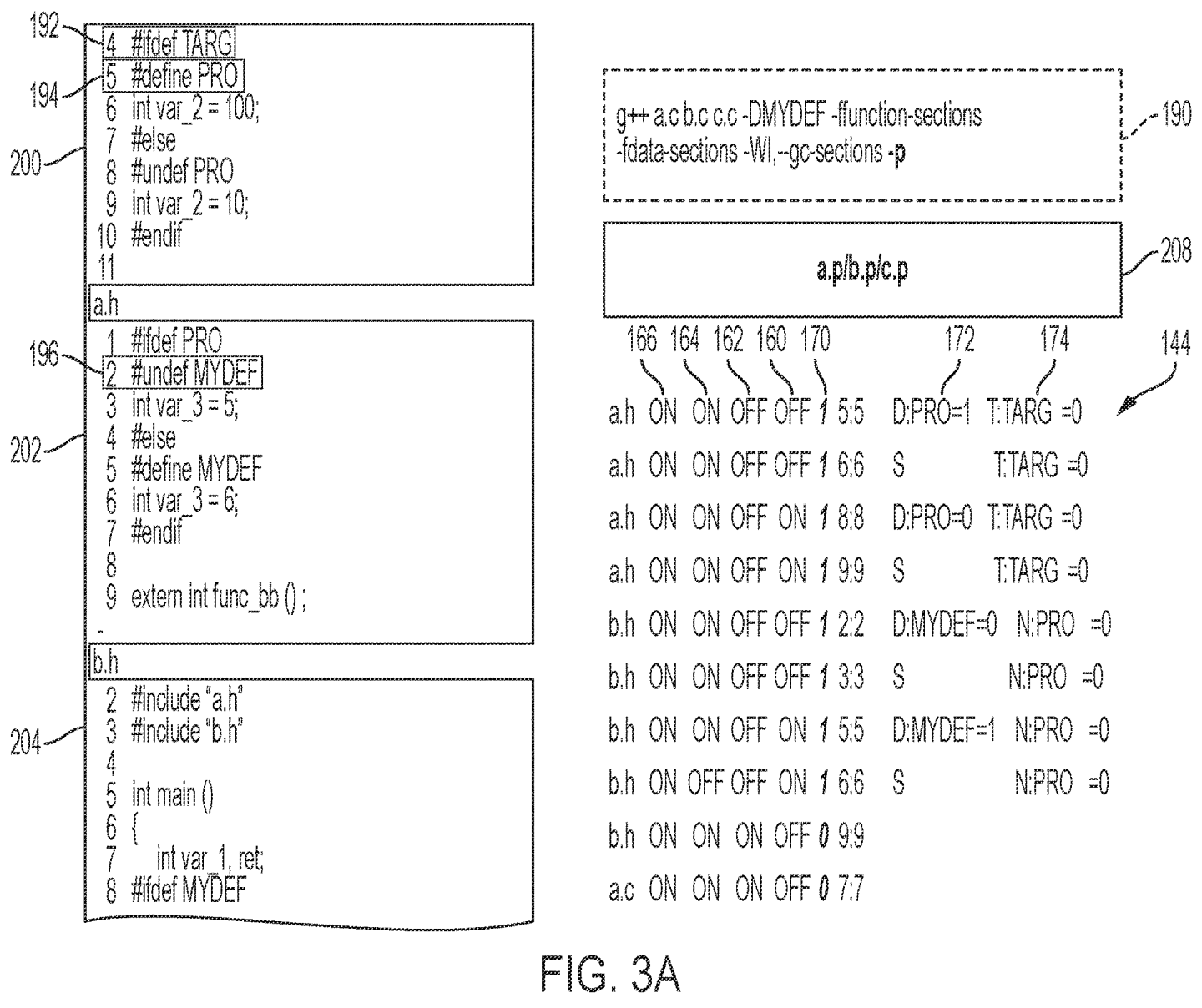

```
a.h
4  #ifdef TARG1
5  #define PRO
6    int var_2 = 100;
7  #else
8    #undef PRO
9    int var_2 = 10;
10 #endif
11
```

```
b.h
1  #ifdef PRO
2  #undef MYDEF
3    int var_3 = 5;
4  #else
5  #define MYDEF
6    int var_3 = 6;
7  #endif
8  extern int func_bb ();
9
```

```
a.c
2  #include "a.h"
3  #include "b.h"
4
5  int main ()
6  {
7    int var_1, ret;
8    #ifdef MYDEF
``` g++ a.c b.c c.c -DMYDEF -ffunction-sections
-fdata-sections -Wl,-gc-sections -p a.p/b.p/c.p

| | 166 | 164 | 162 | 160 | 170 | 172 | 174 | |
|---|---|---|---|---|---|---|---|---|
| a.h | ON | ON | OFF | OFF | 1 5:5 | D:PRO=1 | T:TARG =0 | |
| a.h | ON | ON | OFF | OFF | 1 6:6 | S | T:TARG =0 | |
| a.h | ON | ON | OFF | ON | 1 8:8 | D:PRO=0 | T:TARG =0 | |
| a.h | ON | ON | OFF | ON | 1 9:9 | S | T:TARG =0 | |
| b.h | ON | ON | OFF | OFF | 1 2:2 | D:MYDEF=0 | N:PRO =0 | |
| b.h | ON | ON | OFF | OFF | 1 3:3 | S | N:PRO =0 | |
| b.h | ON | ON | OFF | ON | 1 5:5 | D:MYDEF=1 | N:PRO =0 | |
| b.h | ON | OFF | OFF | ON | 1 6:6 | S | N:PRO =0 | |
| a.c | ON | ON | ON | OFF | 0 9:9 | | | |
| a.c | ON | ON | ON | OFF | 0 7:7 | | | |

```
a.c
 9   var_1 = 3;
10   ret = 1;
11   printf("var_1=%d, var_2=%d, var_3=%d!\n",
12        var_1, var_2, var_3);
13   #else
14   var_1 = 4;
15   ret = 0;
16   printf("var_1=%d, var_2=%d, var_3=%d!\n",
17        var_1, var_2, var_3);
18   #endif
19   func_bb();
20□  return ret;
21 }
```

```
b.c
 1  #include <stdio.h>
 2  #define MYDEF
 3
 4  int func_bb()
 5  {
 6    int var_4, ret;
 7    #if defined(PRO) && defined (MYDEF)
 8    var_4 = 7;
 9    printf("var_4=%d!\n", var_4);
10    #else
11    var_4 = 8;
12    printf("var_4=%d!\n", var_4);
13    #endif
14  }
```

206 a.c  ON ON OFF ON  1 9:12  S        N:MYDEF=1
a.c  ON ON OFF OFF 1 14:17 S        N:MYDEF=1
a.c  ON ON ON OFF 0 19:20           D:MYDEF=1 b.c  ON ON OFF ON  0 2:2            D:MYDEF=1
b.c  ON ON ON OFF 0 6:6    S        N:MYDEF=1
b.c  ON ON ON OFF 1 8:9    S        N:PRO=0 N:MYDEF=1
b.c  ON ON OFF ON 1 11:12  S        N:PRO=0 N:MYDEF=1 c.c  OFF OFF ON OFF 0 6:6
c.c  OFF OFF OFF ON 1 8:9    S      N:PRO=0 N:MYDEF=1
c.c  OFF OFF ON ON 1 11:12   S      N:PRO=0 N:MYDEF=1
c.c  OFF OFF ON OFF 0 14:14

(debugger) stop if (MYDEF==1)
[1] MacroEnclosed BP: stop if (MYDEF==1)
[1.1] stop in 'int main()'                File /u/sunny/test/a.c, Line 9.
[1.2] stop in 'int func_bb()'             File /u/sunny/test/b.c, Line 11.
(dbx64) continue
[1.1] stopped in main at line 9 in file "a.c" (MEBP: if (MYDEF==1))

FIG. 4

| FileName | ObjectLinkedValid | FuncSectionLinkedValid | StatementsCompiledValid | MacroEnclosed | MacroEnclosedLevel | LineNoStart | LineNoEnd | PreprocessAction | AssignedMacroValue |
|---|---|---|---|---|---|---|---|---|---|
| a.h | ON | ON | ON | OFF | 1 | 5,5 | S | D,PRO=1 | |
| a.h | ON | ON | ON | OFF | 1 | 6,6 | S | D,PRO=0 | |
| a.h | ON | ON | ON | ON  | 1 | 8,8 | S | D,MYDEF=0 | |
| a.h | ON | ON | ON | OFF | 1 | 9,9 | S | D,MYDEF=1 | |
| b.h | ON | ON | ON | OFF | 1 | 2,2 | S | | T,TARG=0 |
| b.h | ON | ON | ON | OFF | 1 | 3,3 | S | | T,TARG=0 |
| b.h | ON | ON | ON | ON  | 1 | 5,5 | S | | T,TARG=0 |
| b.h | ON | ON | ON | OFF | 1 | 6,6 | S | | T,TARG=0 |
| a.c | ON | ON | ON | OFF | 0 | 9,9 | S | | N,PRO=0 |
| a.c | ON | ON | ON | OFF | 0 | 7,7 | S | | N,PRO=0 |
| a.c | ON | ON | ON | OFF | 0 | 9,12 | S | | N,PRO=0 |
| a.c | ON | ON | ON | ON  | 1 | 14,17 | D,MYDEF=1 | | N,PRO=0 |
| a.c | ON | ON | ON | OFF | 0 | 19,20 | S | | |
| b.c | OFF | OFF | ON | OFF | 0 | 2,2 | S | | M,MYDEF=1 |
| b.c | OFF | OFF | ON | OFF | 0 | 6,6 | S | | M,MYDEF=1 |
| b.c | OFF | OFF | ON | ON  | 1 | 8,9 | S | | |
| b.c | OFF | OFF | ON | OFF | 0 | 11,12 | S | | N,MYDEF=1 |
| c.c | OFF | OFF | OFF | OFF | 0 | 6,6  | S | | N,PRO=0 |
| c.c | OFF | OFF | OFF | ON  | 1 | 8,9  | S | | N,PRO=0 |
| c.c | OFF | OFF | OFF | OFF | 0 | 11,12 | S | | N,PRO=0 |
| c.c | OFF | OFF | OFF | OFF | 0 | 14,14 | S | | N,PRO=0 |

Legend:

| Field | Description |
|---|---|
| FileName (148) | FileName of compiling unit |
| ObjectLinkedValid (166) | The object linked or not |
| FuncSectionLinkedValid (164) | The function statements linked or not |
| StatementsCompiledValid (162) | The SourceCode statements compiled or not |
| MacroEnclosed (160) | SourceCode Enclosed by Macro |
| MacroEnclosedLevel (170) | The Level depth of macro enclosed |
| LineNoStart (152) | The start line number of enclosed source code |
| LineNoEnd (154) | The end line number of enclosed source code |
| PreprocessAction (168) | The action relative to Macro |
| MacroName | Macro Name |
| AssignedMacroValue | The current macro value assigned |
| PreviousAssignedMacroValue (172) | The macro value assigned in earlier definition |
| ReferredMacroName | Macro name referred |
| CurrentMacroValue (174) | The current value of referred Macro |

```
  1 #include <stdio.h>
  2 #include "a.h"
  3 #include "b.h"
  4
  5 int main ()
  6 {
  7   int var_1 ret;
  8 #ifdef MYDEF
  9   var_1 = 3;
 10   ret = 1;
 11   printf("var_1=%d, var_2=%d, var_3=%d\n",
 12          var_1, var_2, var_3);
 13 #else
 14   var_1 = 4;
 15   ret = 0;
 16   printf("var_1=%d, var_2=%d, var_3=%d\n",
 17          var_1, var_2, var_3);
 18 #endif
 19   func_bb()
 20   return ret;
 21 }
a.c
```

```
 1 #include <stdio.h>
 2 #define PRO
 3 extern int func_dd();
 4 int func_bb()
 5 {
 6   int var_4 ret;
 7 #if defined(PRO) && defined (MYDEF)
a.c
``` g++ a.c b.c c.c -DMYDEF -ffunction-sections -fdata-sections -Wl,--gc-sections -p

| | | | a.p/b.p/c.p/d.p | | |
|---|---|---|---|---|---|
| a.h | ON | OFF OFF 1 | 5:5 | D:PRO=1 | T:TARG =0 |
| a.h | ON | OFF OFF 1 | 6:6 | S | T:TARG =0 |
| a.h | ON | OFF ON 1 | 8:8 | D:PRO=0 | T:TARG =0 |
| a.h | ON | OFF ON 1 | 9:9 | S | T:TARG =0 |
| b.h | ON | OFF OFF 1 | 2:2 | D:MYDEF=0 | N:PRO =0 |
| b.h | ON | OFF OFF 1 | 3:3 | S | N:PRO =0 |
| b.h | ON | OFF ON 1 | 5:5 | D:MYDEF=1 | N:PRO =0 |
| b.h | ON | OFF ON 1 | 6:6 | S | N:PRO =0 |
| a.c | ON | ON OFF 0 | 9:9 | S | |
| a.c | ON | ON OFF 0 | 7:7 | | |
| a.c | ON | ON OFF 0 | 1 | 9:12 | S | N:MYDEF=1 |
| a.c | ON | ON OFF 0 | 1 | 14:17 | S | N:MYDEF=1 |
| a.c | ON | ON OFF 0 | 22 | D:PRO=1 | |
| a.c | ON | ON OFF 0 | 3:6 | | |
| b.c | ON | OFF ON 1 | 8:9 | S | N:PRO =1 | N:MYDEF=1 |
| b.c | ON | OFF OFF 1 | 11:13 | S | N:PRO =1 | N:MYDEF=1 |
| b.c | ON | OFF OFF 0 | 6:6 | | |
| c.c | OFF OFF ON 1 | 8:9 | S | N:PRO =0 | N:MYDEF=1 |
| c.c | OFF OFF ON 1 | 11:12 | S | N:PRO =0 | N:MYDEF=1 |
| c.c | OFF OFF ON 0 | 14:14 | | | |

SETTING BREAKPOINTS FOR SOURCE CODE SEGMENTS ENCLOSED BY MACROS

BACKGROUND

The present invention generally relates to computer technology, specifically, to checking the validity of computer instructions at time of updating a computer program, and more specifically to checking the validity of computer instructions that include, or are enclosed by macros.

Porting computer programs from one platform or source to another is important to allow the computer programs to be used on several platforms. For example, in the case of a cloud computing platform, several computer programs, such as open source programs are available to be used for particular functionality such as container support. Porting such computer programs from one platform (e.g., cloud computing platform, mobile computing platform, operating system, etc.) to another facilitates uninterrupted use of software that use such computer programs.

SUMMARY

One or more embodiments of the present invention are directed to methods for setting breakpoints for source code segments enclosed by macros. A non-limiting example method includes receiving, by a processor, an updated version of a computer program, the updated version including a source code. The method also includes preprocessing, by a compiler, the source code for a target computing platform. Preprocessing the source code by the compiler includes identifying a macro condition associated with one or more computer instructions enclosed by a macro, determining object code corresponding to the one or more computer instructions based on the current value of the macro condition, and generating object code and macro information, the macro information including one or more breakpoint conditions in the macro.

Other embodiments of the present invention implement features of the above-described methods in systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B depict an example of source code information and macro information generated by a compiler;

FIG. 4 depicts the macro information of FIGS. 3A and 3B with annotations;

FIGS. 7A and 7B depict an example of source code information and macro information generated by a compiler;

Figure 1:
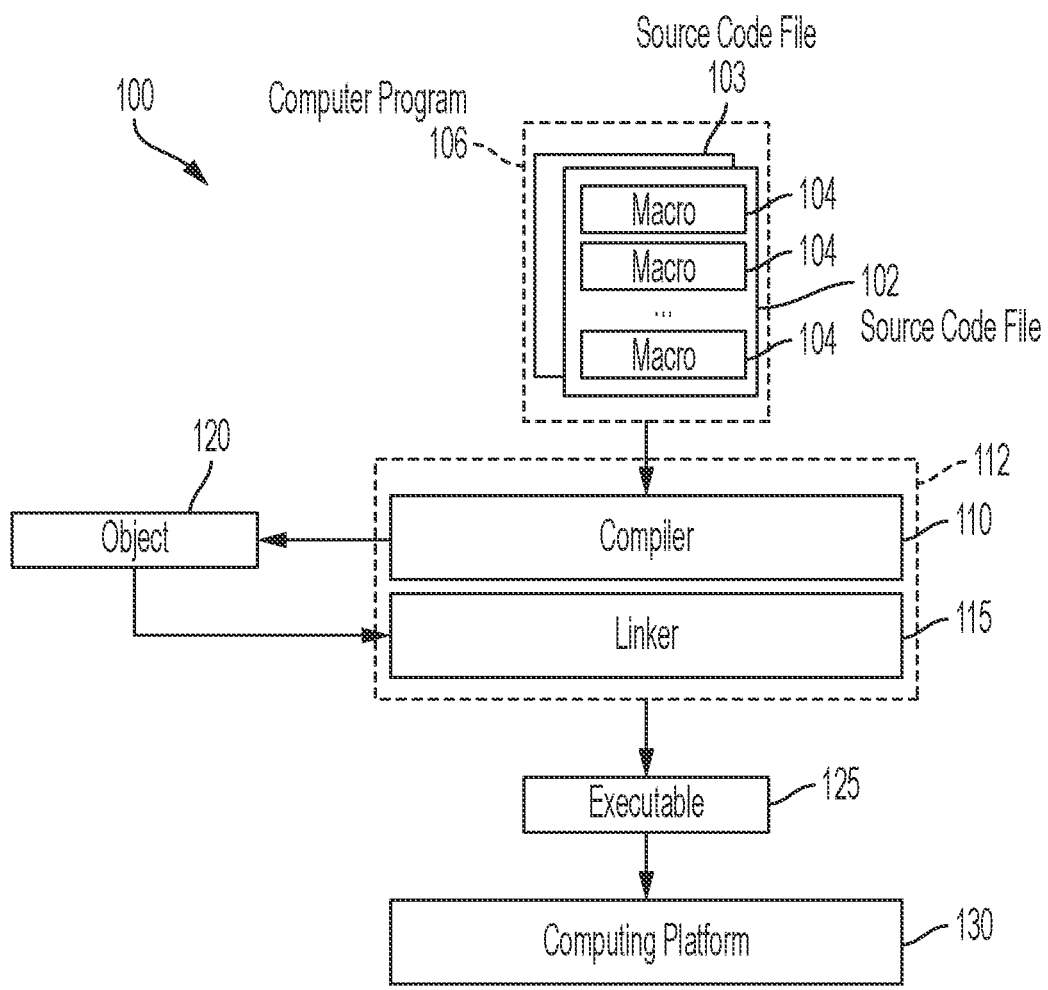
FIG. 1 depicts a system for validating computer instructions enclosed by macros according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to devices, systems, and methods for setting breakpoints for source code segments enclosed by macros. One or more embodiments of the present invention can be utilized for validating computer instructions that are enclosed by macros when a computer program is being compiled for a particular computing platform and/or being updated. An embodiment of a system for compiling and/or validating source code includes a compiler configured to receive source code files and to generate object code files. The compiler includes a preprocessor configured to scan the source code for macro conditions, and to generate macro information that is used by a debugger to validate the object code files.

In one or more embodiments, the preprocessor is configured to generate macro information that directs the debugger to set one or more breakpoints at selected code lines enclosed by the macro ("macro enclosed" codes or records). Breakpoints may be used to cause a debugger to pause at the code line indicated by a breakpoint. At this point, validated parts of code can be run while pausing execution of the macro in areas that need further testing.

For example, the macro information includes a "macro enclosed level" field (also referred to as a "MacroEnclosedLevel" field) that is populated by the preprocessor based on code files that match a macro condition. The MacroEnclosedLevel field may include a value for one of a plurality of code level depths. A level depth of a line of code indicates whether the line is nested within a piece of code. For example, a code line is level zero if it is not nested, a code line is level one if nested within a level zero piece of code, and a code line is level two if nested in a level one piece of code. There may be any number of levels that could be defined. Breakpoint locate and breakpoint build modules in the debugger locate and set breakpoints during the validation process.

One or more embodiments of the present invention are rooted in computing technology, and provide improvements to computing technology, particularly, computer software development. One or more embodiments of the present invention provide an effective means to allow a debugger to set single- or multi-level breakpoints at code lines enclosed by a macro (e.g., all code lines enclosed by a macro that satisfy a selected macro condition), which can assist users and systems in quickly and efficiently debugging. For example, one or more embodiments support the setting of multiple breakpoints in one debugger command, and the setting of breakpoints at all code segments that are validly compiled and linked. One or more embodiments also support multi-level macro enclosed debugging, and flexible and customized macro condition set debugging. The one or more embodiments reduce development time and effort and significantly improve efficiency of validation processes.

Existing technical solutions for analyzing computer programs and debugging computer instructions do not contemplate specific technical challenges that occur when updating large-scale enterprise level projects with source code changes that may not be used by particular target computing platform(s).

More and more open-source software applications are merged into various platforms to support, for example, cloud development and containerized applications. Porting open-source software is one way to build up a robust ecosystem. A large amount of conditional code, with code blocks selected by means of preprocessor directives (#ifdef, etc.), are used in many portable open sources to handle the difference between platform, compiler, libraries, and header files. Tools such as Autotools, library tools, and meson/ninja, etc. are often used in a large open-source projects to provide convenient configurations for different platforms/compilers automatically and secretly. However, such tools also increase the complexity of understanding the code structure and make it more difficult to locate the root cause by using a debugger when the multiple macro condition sets are used on different platforms and compilers. For example, a macro (defined or undefined) can affect different code segment enclosed or unenclosed, which makes it difficult or impossible to make a debugger stop all enclosed code segments effectively based on macros, as macro enclosed information is not currently passed to linking stages or debugging information. Embodiments address the above problems and provide the advantages discussed above.

FIG. 1 depicts a system 100 for validating computer instructions enclosed by macros according to one or more embodiments of the present invention. The depicted system 100 includes a computer program 106 that is to be compiled by a compiler 110 to generate a corresponding object file(s) 120. The computer program 106 may be written for a different computing platform, and may be ported for execution on a target computing platform 130. The compiler 110 can be part of a development tool 112, such as an integrated development environment (IDE). The development tool 112 can also include a linker 115 that generates an executable file 125 based on the object file(s) 120. The executable file 125 is executed on a target computing platform 130. It is understood that the executable file 125 can include multiple files in one or more examples. The compiler 110 generates the object file 120 specifically for the target computing platform 130 in one or more embodiments of the present invention. Alternatively, or in addition, in one or more embodiments of the present invention, the linker 115 generates the executable file 125 particularly for the target computing platform 130. It should be noted that while a compiler and linker can be separate tools, with separate runtime instructions, as used herein, "compiling" or "building" the computer program 106 can include compiling, linking, and any other operations that may be required to convert the computer instructions in the computer program 106 into machine instructions that are executable by the target computing platform 130. Generating such machine executable instructions in the executable file 125 from the computer program 106 is not practically doable by a human, for example, as a mental process.

The target computing platform 130 can be cloud computing platform architecture, an operating system, a processor architecture, or any other type of computing platform to which the computer program 106 is being ported. In other words, the computer program 106 may not have been developed (written) specifically for the target computing platform 130. The compilation and linking by the development tool 112 facilitates executing the computer program 106 on the target computing platform 130. Alternatively, or in addition, the development tool 112 improves the efficiency of execution of the computer program 106 when executing on the target computing platform 130.

The computer program 106 can include multiple source code files, including, for example but not limited to, a source code file 102 ("file" 102), and a source code file 103 (file 103). The computer program 106 can be open source in one or more embodiments of the present invention. It is understood that the computer program 106 can include several (hundreds, thousands) of source code files, although only two of them are depicted here. Each of the source code files 102, 103 can include several computer instructions (lines of code), for example, hundreds, thousands, etc. In one or more embodiments of the present invention, the source code files of the computer program 106 are organized in a hierarchical manner, for example using a directory structure (not shown).

One or more of the source code files in the computer program 106 use macros 104. For example, the source code file 102 includes several macros 104. The depicted macros 104 can each be an instance of a different macro. Alternatively, or in addition, the macros 104 can be associated with a conditional expansion. Conditional expansion can be dependent on one or more configurations of the compiler 110, that a user (e.g., developer) can adjust prior to executing the compiler 110. Alternatively, or in addition, the conditional expansion can be dependent on one or more environmental settings of the computing platform 130 (e.g., operating system level variables, hardware type, etc.). Alternatively, or in addition, the conditional expansion can be dependent on runtime option that the user provides at time of execution of the development tool 112 (i.e., compiler 110 and linker 115). Other dependencies of the conditional expansion can be used in other embodiments of the present invention. In one or more embodiments of the present invention, the macros 104 that are used in the file 102 can be defined in the file 102 itself, or any other file in the computer program 106, for example the file 103.

The development tool 112 includes a user interface that is used to interact with the source code files 102, 103. A user can navigate the directory structure, and perform operations such as add, delete, copy, paste, move, edit, etc. with the source code files of the computer program 106. The user interface displays the computer instructions of the computer program using one or more contextual visual attributes. For example, computer instructions contents of different types (e.g., conditional statements, function calls, variables, keywords, macros, etc.) can be displayed using different color, different fonts, or other such visual attributes. The visual representation of the computer instructions can be adjusted by the development tool 112 based on results of the various features of one or more embodiments of the present invention.

Figure 2:
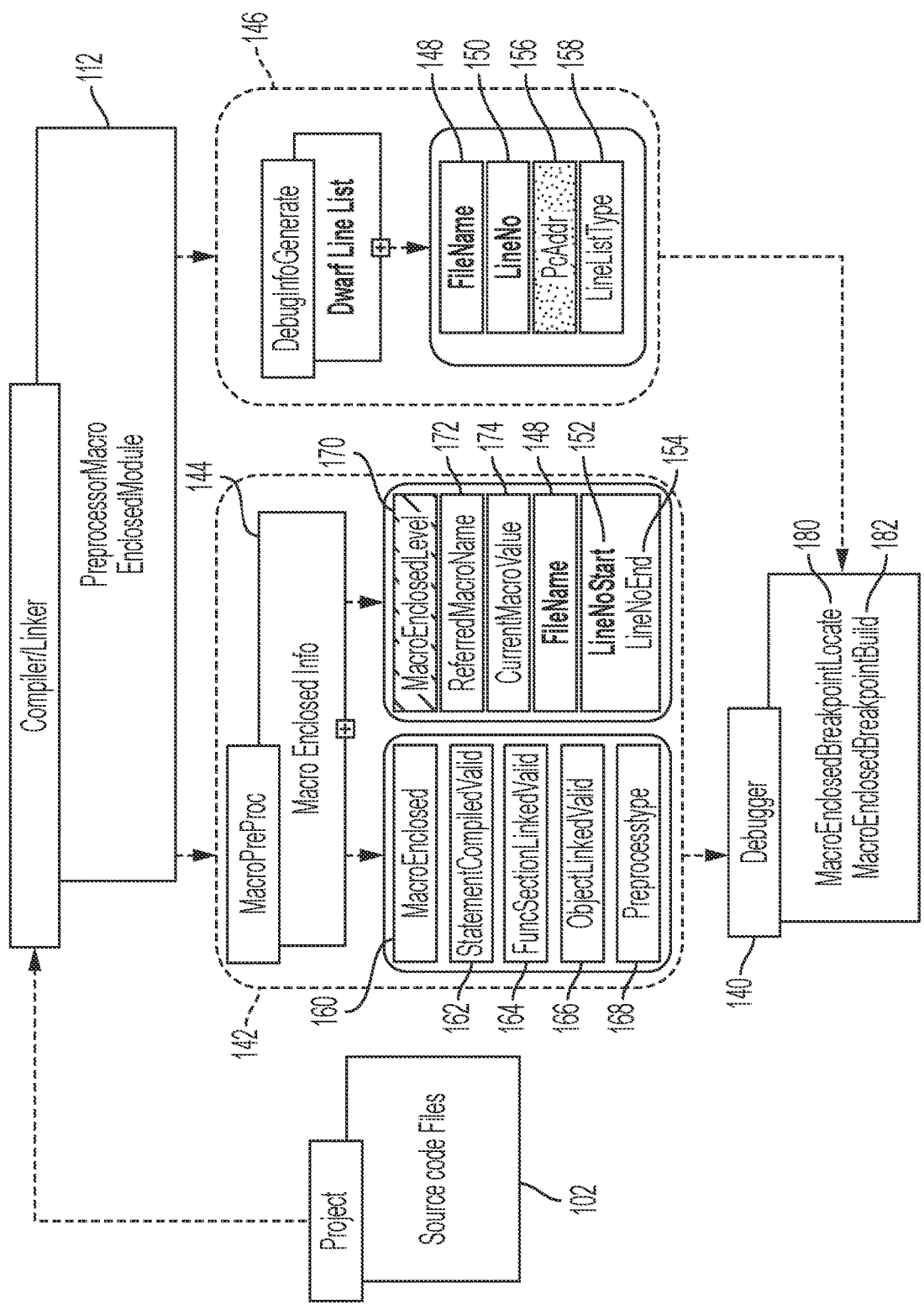
FIG. 2 depicts a development tool for compiling source code to generate object code, and validating the object code, according to one or more embodiments of the present invention.

FIG. 2 depicts an example structure of the development tool 112 according to one or more embodiments of the present invention. The development tool 112 (also referred to as a "compiler/linker" 112) facilitates identifying macros 104, compile time conditions, values of the compile time conditions, updating the user interface, and various other features of the technical solutions described herein. The architecture of the system 100 includes a debugger 140 that receives a command to initiate identifying macros in the computer program 106. The command can be provided via a command-line, a setting configuration, or any other user interaction by the user.

The compiler/linker 112 also includes a macro preprocessor 142 that generates macro information 144 by analyzing the source code files of the computer program 106. The macro information 144 can include compile time conditions, current values of the compile time conditions, assigned compile time condition values, macro names, preprocessing type, referred macro names, etc.

In addition to macro information, the development tool 112 is configured to generate information used by the debugger 140 to debug the source code files 102. This information is referred to as debug information 146, which may include a dwarf line list or other data structure.

Examples of the debug information 146 in the list include file name 148 (also referred to as "FileName"), which is the file name of the compiling unit, and line numbers 150 (also referred to as "LineNo") of instructions to be debugged, which may be represented by starting line number 152 ("LineNoStart") and ending line number 154 ("LineNoEnd"). Other debugging information includes address 156 ("Addr") and line list type 158 ("LineListType").

The compiler/linker 112 receives source code files, and a source code file may include one or more macros. One or more of the macros are conditional. A dynamic compile time condition is associated with such conditional macros, such that the computer instructions in the conditional macros are compiled (i.e., converted to object code) only if the associated compile time condition is satisfied. If the compile time condition is not satisfied, the computer instructions in a conditional macro are not included in the object code. Compile time conditions can indicate a combination type of hardware and software of the target computing platform. For example, a compile time condition can indicate that the macro is to be expanded only if the platform uses a particular operating system such as, LINUX®, AIX®, INTERIX®, Z/OS®, etc. Alternatively, or in addition, the compile time condition can indicate that the macro 104 is to be expanded only if one or more other source code files (e.g., a header file) is included. In some examples, the expanded macro 104 can itself be an inclusion of additional source code files, such as a library, an application programming interface, etc. Alternatively, or in addition, the expanded macro 104 can cause a particular type of hardware component or software component to be "mounted."

"Mounting" includes acquiring access to the component, e.g., recognizing, reading, and processing a file system structure, a storage medium, etc., before registering the component for use. Several additional or alternative operations can be performed by the computer instructions enclosed in the macros 104 in one or more embodiments of the present invention.

Various types of information are used by the preprocessor 142 to identify macros, as well as to set macro breakpoints within a macro as discussed further herein. A breakpoint refers to a line of code at which the debugger 140 should pause execution of the macro operation.

The macro information 144 includes various macro enclosed fields in which corresponding values are populated. A MacroEnclosed field 160 includes a macro enclosed value that indicates whether a source code line or lines is/are enclosed by a macro. A "StatementCompiledValid" field 162 includes a value that indicates whether a statement is compiled or not, and a "FuncSectionLinkValid" field 164 includes a value that indicates whether a function is linked. An "ObjectLinkedValid" field 166 indicates whether an object code is linked to an executable file. A "preprocesstype" field 168 indicates the type of preprocessor or preprocessing method.

The macro enclosed fields include information provided by the compiler/linker 112 that can be used by the debugger 140 to set breakpoints at lines within a macro. The breakpoints, in one or more embodiments of the present invention, are multi-level breakpoints, i.e., breakpoints that can be set for different level depths.

A MacroEnclosedLevel field 170 provides capability for the compiler/linker 112 to direct the debugger 140 set one or more breakpoints in a macro. The MacroEnclosedLevel field 170 is assigned a macro enclosed level value by the preprocessor 142 (e.g., 0, 1 or 2, or higher) to indicate the level depth of an enclosed line or segment. The outset level of the field 170 is zero, and is increased by the preprocessor 142.

To support setting breakpoints, the macro information 144 may also include a "referred macro name" field 172 (also referred to as a "ReferredMacroName" field), which indicates the name of a referred macro (e.g., TARG, MYDEF, PRO, etc.), and a "current macro value" field 174 (also referred to as a "CurrentMacroValue" field), which indicates the current value of the referred macro. This information is then used by the debugger 140 to locate and build breakpoints.

For example, the debugger 140 may include a breakpoint locate module 180 that allows the debugger 140 to locate macro enclosed records (object files or code segments therein) by searching the dwarf line list. A breakpoint build module 182 allows the debugger 140 to set breakpoints at code segments that are associated with a non-zero macro enclosed level value.

FIGS. 3A and 3B depict an example of macro information 144 in combination with source code files 120. The macro information 144 maps code segments and source code files with macro conditions. FIG. 4 depicts the macro information 144 with annotations of the various fields. In this example, the option "-p" in a runtime command 190 triggers the compiler/linker 112 to generate macro enclosed fields discussed above. The preprocessor type 'S' marks the source code scope enclosed by the macro; whereas 'D' marks the definition of macros. Other preprocessor types can be specified in other embodiments of the present invention.

It is noted that the macro information 144 may include all of the following information or a subset thereof, and may include other types of information. One or more embodiments are discussed herein in conjunction with this example for illustrative purposes; the one or more embodiments are not intended to be limited to this example or any particular instance of compiling and/or debugging.

In FIGS. 3A and 3B, the debugger 140 uses three types of macros, including TARG 192, PRO 194, and MYDEF 196. The source code files include file 200 (a.h.), file 202 (b.h), file 204 (a.c.) and file 206 (b.c.). In this example, code segments at lines 9-12 of the file 204 should be compiled because the compile time condition of macro MYDEF 196 is defined in the runtime command 190 to initiate the compiler/linker 112 to compile the code segments into a preprocessed file 208. The preprocessed file 208 is used subsequently to generate object code.

Figure 5:
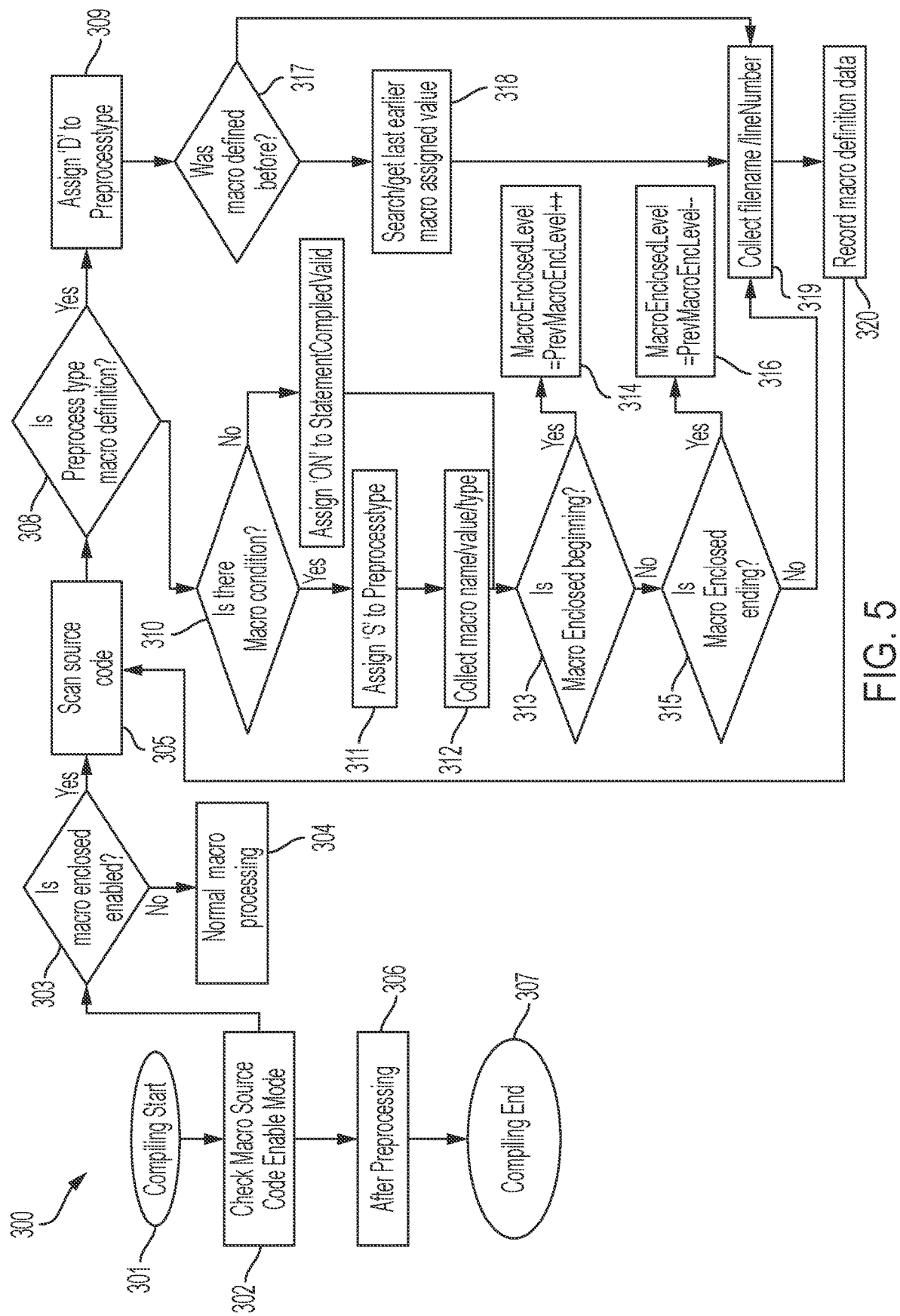
FIG. 5 depicts a flowchart of a method of updating macro enclosed source code, according to one or more embodiments of the present invention.

FIG. 5 depicts a flowchart of a method 300 for generating computer instructions for macros according to one or more embodiments of the present invention. The method 300 includes a number of steps or stages represented by blocks 301-320. It is noted that the method may include all of the steps or stages or fewer than all of the steps or stages. The method 300 is discussed in conjunction with the example of FIGS. 3A, 3B and 4 for illustration purposes, but is not so limited.

The method 300 is described as being performed by the compiler/linker 112. However, the method 300 can be performed by any suitable processing device or system.

At block 301, compiling starts, and the compiler/linker 112 checks whether macro source code mode is enabled (block 302). If detecting macros has been enabled (block 303), the compiler/linker 112 scans the computer program 106 using the macro preprocessor 142 (block 305). Otherwise, the compiler/linker 112 proceeds with typical macro processing according to existing solutions (block 304). The scanning process initiated at block 305 is discussed further herein.

The scanning process (blocks 305-320) is repeated for each computer instruction in the computer program 106, and at least for macros 104 in the computer program. Once all of the macros 104 have been processed in this manner and the macro information 144 is captured, the compiler/linker 112 continues to compile the computer instructions in the computer program 106 as it typically does (block 306), and compiling ends (block 307).

The scanning process initiated at block 305 begins at block 308, where the Preprocesstype field 168 is checked to determine whether there is a macro definition (i.e., whether the currently scanned instruction is a definition of compile time condition, e.g., #define MYDEF). If so, the Preprocesstype value is assigned a flag 'D' at block 309 (e.g., line 2 of the b.c. file 206). Further, if there are computer instructions that are enclosed in the compile time condition, the MacroEnclosed field 160 is set to 'ON', (e.g., lines 9-12 of the a.c. file 204), otherwise, it is set to 'OFF' (e.g., lines 14-17). Macro information parameters including SpecificMacroType, ReferredMacroName, and CurrentMacroValue are also recorded at this time in one or more embodiments of the present invention.

If there is not a macro definition, it is determined whether there is a macro condition at block 310 (i.e., whether the instruction is a condition of a compile time condition), and the compiler/linker 112 assigns flag 'S' at block 311. The macro name, present value, and type are collected from the computer instruction, at block 312.

At block 313, the compiler/linker 112 checks whether there is a macro enclosed beginning, which is defined by the compiler/linker 112 during syntax parsing. If so, at block 314, the value of the MacroEnclosedLevel field 170 is increased (e.g., from zero to one).

At block 315, the compiler/linker 112 checks whether there is a macro enclosed end, which is also defined by the compiler/linker 112 during syntax parsing. If so, at block 316, the value of the MacroEnclosedLevel field 170 is decreased (e.g., from one to zero). In the case of encountering a definition of a compile time condition (flag D), the compiler/linker 112 checks whether the compile time condition (e.g., 'MYDEF') was defined before, at block 317. The check is performed by searching the macro name through the existing information in the macro information 144. If the compile time condition was defined before, the compiler/linker 112 searches and obtains the last value assigned to the compile time condition (e.g., '1' in the ongoing example of MYDEF; 1 is passed by compiling command option '-DMYDEF'), at block 318. The obtained value is recorded into an "EarlierAssignedMacroValue" field.

The compiler 110 also collects the metadata associated with the macro 104, such as file name and line numbers (start, end), at block 319. In addition, the macro enclosed level information is collected. The collected information is stored in the macro information 144, at block 320.

Figure 6:
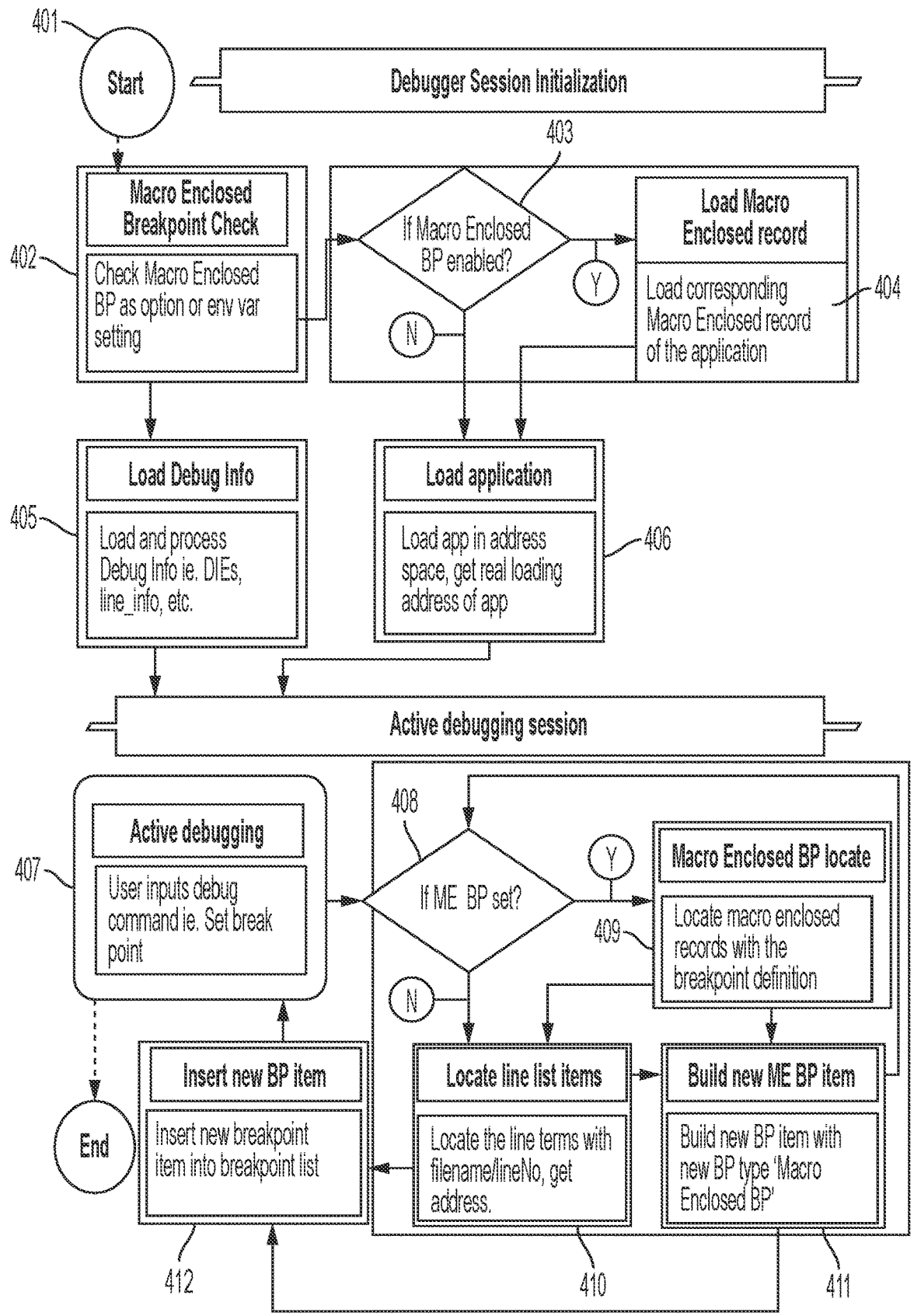
FIG. 6 depicts a flowchart of a method of debugging an application, according to one or more embodiments of the present invention.

FIG. 6 is a flowchart depicting a method 400 of debugging an application according to one or more embodiments of the present invention. The method 400 includes a number of steps or stages represented by blocks 401-412. It is noted that the method may include all of the steps or stages or fewer than all of the steps or stages. The method 400 is described as being performed by the debugger 140. However, the method 400 can be performed by any suitable processing device or system.

The method 400 includes a debugger session initialization method shown at blocks 401-406, and an active debugging session shown at blocks 407-412.

The debugger session initialization begins at block 401, and the debugger 140 checks whether setting of macro enclosed breakpoints is an option at block 402. If so, for each record or file, it is determined whether macro enclosed breakpoints are enabled (block 403). If enabled, the corresponding macro enclosed record (e.g., the preprocessed file 208) is loaded at block 404.

At block 405, the debugging information (e.g., debug information 146) is loaded to the debugger 140. At block 406, the application is loaded to the debugger 140.

Figure 7B:
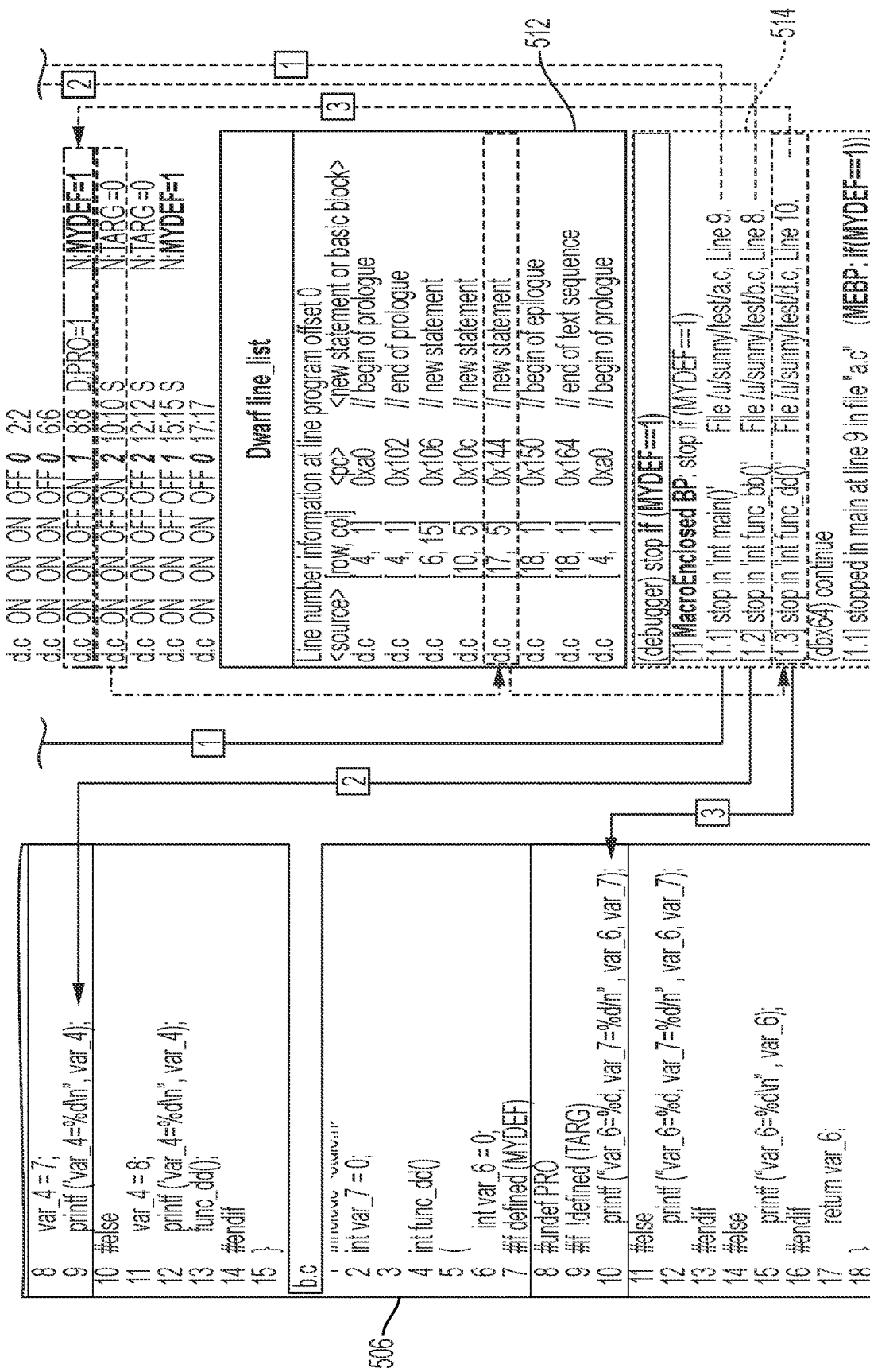

The active debugging session of blocks 407-413 is discussed in conjunction with an example shown in FIG. 7. In this example, the debugger analyzes source code files 502, 504 and 506 enclosed by macros MYDEF and PRO, based on a runtime command 508 and macro information 510. The macro information 510 includes the same or similar fields as those of the macro information 144 discussed above. The debugger 140 uses a dwarf line list 512 to locate records which have a breakpoint, by consulting a breakpoint list 514. The breakpoint list 514 includes references to code lines or segments that have a non-zero MacroEnclosedLevel that is greater than zero.

For example, lines 9-12 in the file 502 (a.c.) are enclosed by the macro MYDEF (MYDEF=1 in the CurrentMacroValue field) and have a breakpoint (MacroEnclosedLevel is equal to one). A corresponding entry in the breakpoint list 514 (denoted as [1.1]) instructs the debugger 140 to pause at these lines. Specific breakpoint levels are denoted in the breakpoint list 514. In this example, the breakpoint list 514 specifies that a breakpoint is defined for line 8 of the file 504, having a level depth of one (indicated by entry [1.2]), and that a breakpoint is defined for line 10 of the file 506 at the function level (level two) of the line, as indicated by entry [1.3] of the breakpoint list 514.

Referring again to FIG. 6, at block 407, a debug command is input, and it is determined at block 408 whether macro enclosed breakpoints are set. If so, at block 409, if a macro enclosed breakpoint is set, the breakpoint locate module 180 of the debugger 140 searches the macro enclosed records (e.g., record enclosed by MYDEF) to find matched records. At block 410, line items with the filename and line number of the matched records (e.g., lines 9-12 of file 502) are found from a dwarf line list (e.g., the list 512). At block 411, a break point type (e.g., the breakpoint type "Macro Enclosed BP" as shown in FIG. 7) is assigned to each matched record. At block 412, the new breakpoints are stored in a breakpoint list (e.g., the breakpoint list 514).

Figure 8:
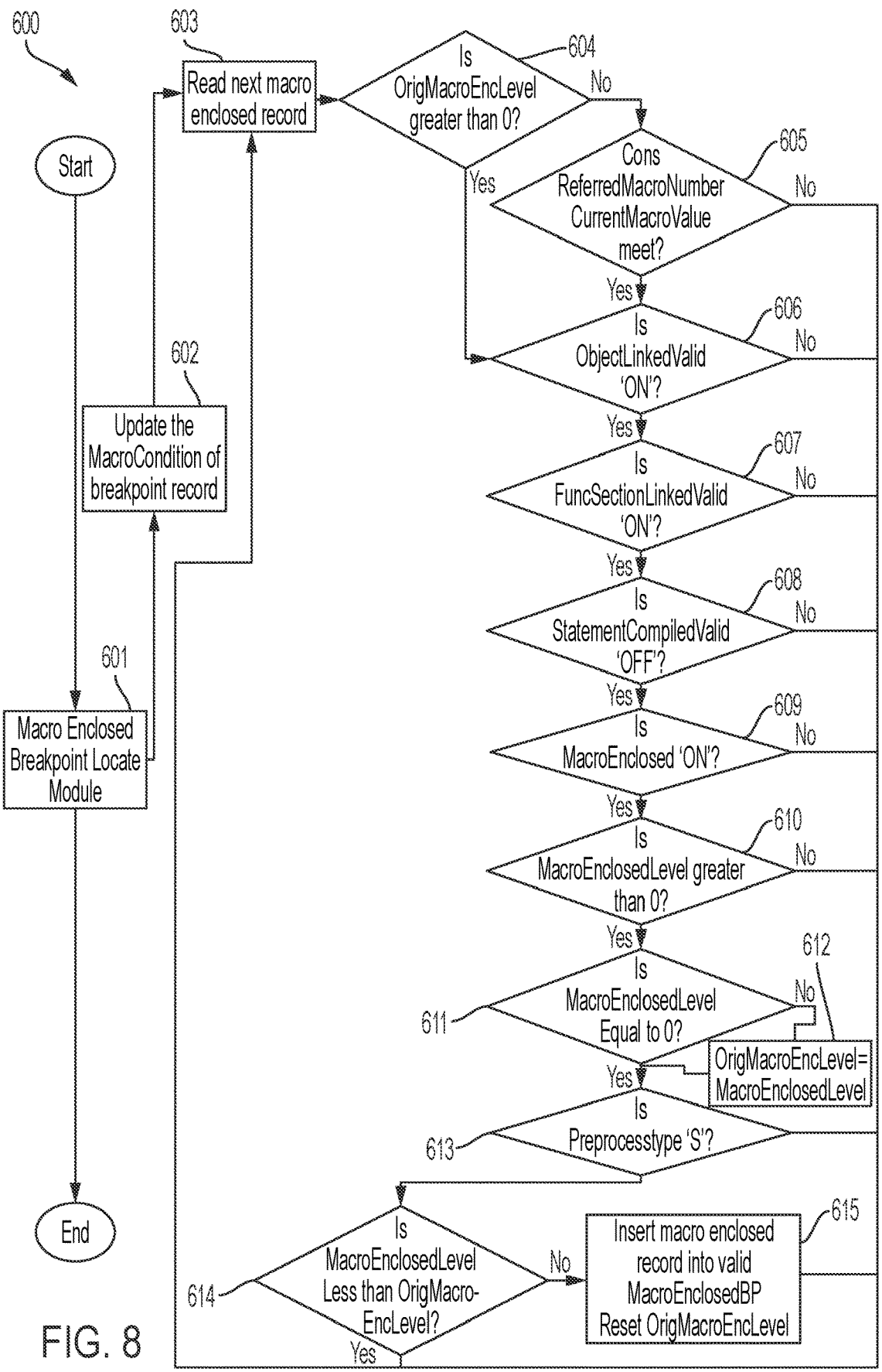
FIG. 8 depicts a flowchart of a method of locating macro enclosed records according to one or more embodiments of the present invention, according to one or more embodiments of the present invention.

FIG. 8 depicts a flowchart of a method 600 of locating macro enclosed records. The method 600 includes a number of steps or stages represented by blocks 601-615. It is noted that the method may include all of the steps or stages or fewer than all of the steps or stages. The method 600 is described as being performed by the breakpoint locate module 180 of the debugger 140. However, the method 600 can be performed by any suitable processing device or system.

At block 601, the breakpoint locate module 180 is prompted to locate records having a breakpoint (e.g., records with a breakpoint set command 'stop if MYDEF=1'). At block 602, the macro condition of "breakpoint" is updated (e.g., the macro condition of MYDEF=1 is set). The module 180 then scans the records sequentially, for example. At block 603, the next macro enclosed record is read, and it is determined whether the MacroEnclosedLevel value for the record is greater than zero (block 604).

If the MacroEnclosedLevel is zero, the module 180 determines if the ReferredMacroName and CurrentMacroValue of the record meet the condition of breakpoint (block 605). For example, the condition is met if MYDEF=1 in the ReferredMacroName and CurrentMacroValue fields. If the condition is not met (e.g., MYDEF=0), then the next record is read (this record is not a breakpoint).

If the MacroEnclosedLevel is non-zero, and the ReferredMacroName and CurrentMacroValue of the record meet the condition of breakpoint (e.g., MYDEF=1), then the method proceeds to block 606.

The module 180 determines whether ObjectLinkedValid=ON (block 606), FuncSectionLinkedValid=ON (block 607), StatementCompiledValid=ON (block 608) and MacroEnclosed=ON (block 609). If all of these conditions are met, the method proceeds to block 610. If any of the conditions are not met (i.e., any of the above fields are set to OFF), the next record is read.

At block 610, it is determined whether the MacroEnclosedLevel of the record is greater than one. If so, the record is already linked with the macro enclosed condition, and the next record is read.

At block 611, it is determined whether the flag OrigMacroEnclLevel is zero, which may be the original MacroEnclosedLevel value or a previously set value. If not, this flag is set to be equal to the MacroEnclosedLevel at block 612. If the flag Preprocesstype is 'S' (block 613), and the MacroEnclosedLevel is less than the OrigMacroEnclosedLevel (block 614), then the record is inserted into the breakpoint list at block 615 and the flag OrigMacroEnclosedLevel is reset.

It is to be understood that although this disclosure includes a detailed description on cloud computing, implementation of the teachings recited herein are not limited to a cloud computing environment. Rather, one or more embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
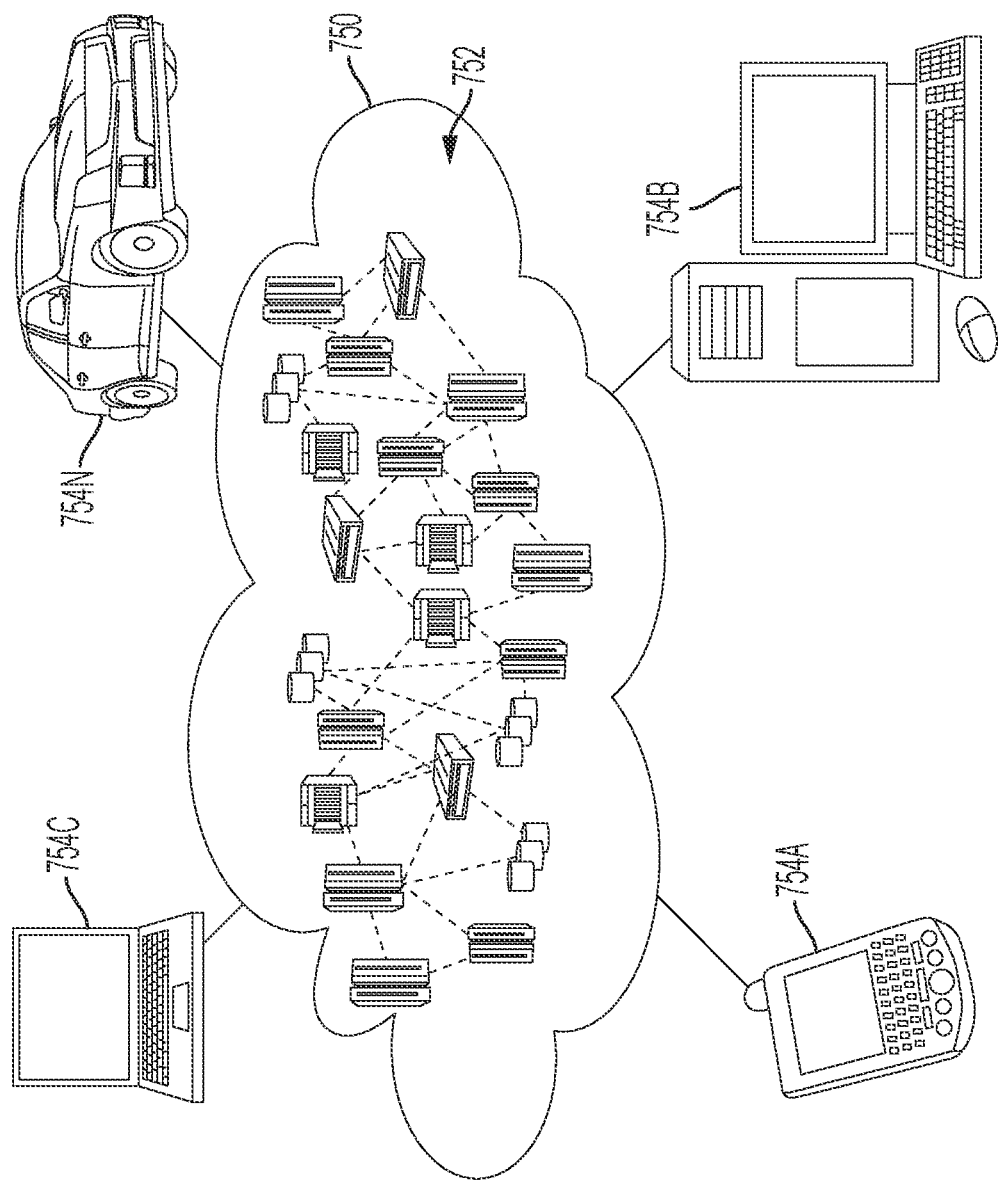
FIG. 9 depicts a cloud computing environment according to one or more embodiments of the present invention.

Referring now to FIG. 9, illustrative cloud computing environment 750 is depicted. As shown, cloud computing environment 750 includes one or more cloud computing nodes 752 with which local computing devices used by cloud consumers, such as, for example, personal digital assistant (PDA) or cellular telephone 754A, desktop computer 754B, laptop computer 754C, and/or automobile computer system 754N may communicate. Nodes 752 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 9 are intended to be illustrative only and that computing nodes 752 and cloud computing environment 750 can communicate with any type of computerized device over any type of network and/or network addressable connection (e.g., using a web browser).

Figure 10:
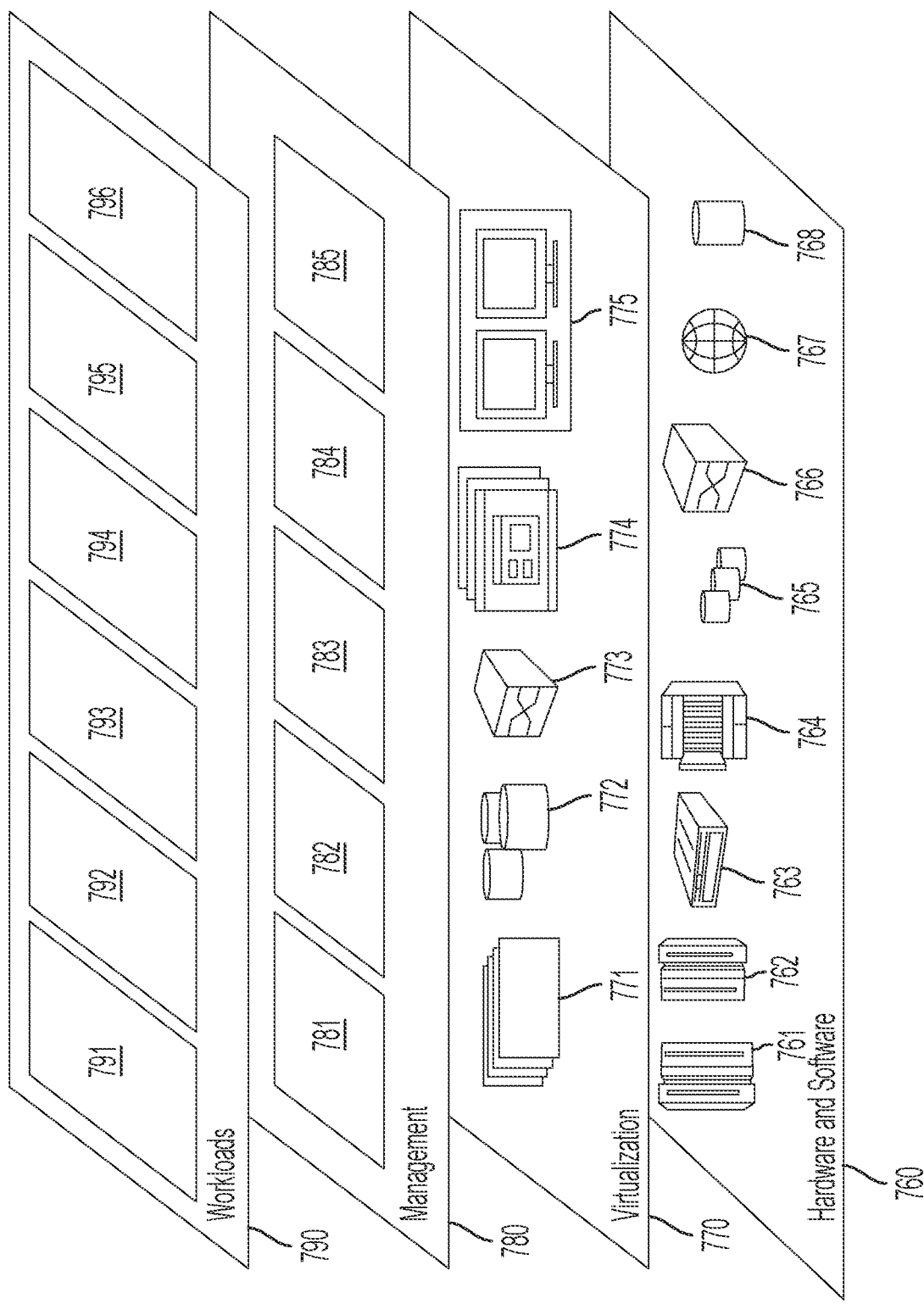
FIG. 10 depicts abstraction model layers according to one or more embodiments of the present invention.

Referring now to FIG. 10, a set of functional abstraction layers provided by cloud computing environment 750 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768. Aspects of embodiments described herein may be embodied in one or more of the above hardware and software components.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and data encryption/decryption 796.

It is understood that one or more embodiments of the present invention are capable of being implemented in conjunction with any type of computing environment now known or later developed.

Figure 11:
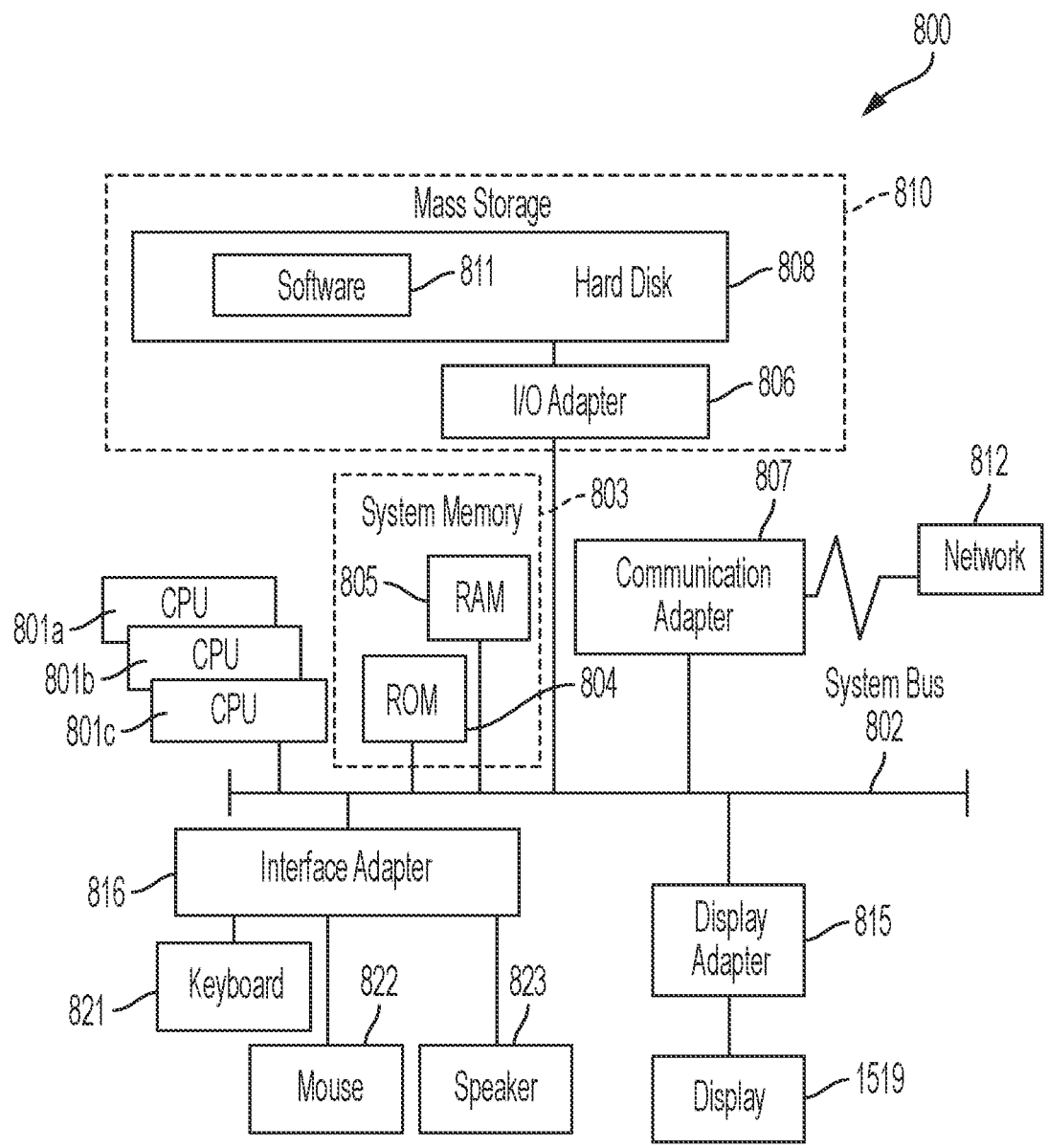
FIG. 11 depicts a computing system according to one or more embodiments of the present invention.

Turning now to FIG. 11, a computer system 800 is generally shown in accordance with an embodiment. All or a portion of the computer system 800 shown in FIG. 11 can be implemented by one or more cloud computing nodes 10 and/or computing devices 754A-N of FIG. 9. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a serial advanced technology attachment (SATA) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS® or AIX® operating system, to coordinate the functions of the various components shown in FIG. 11.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 11 is not intended to indicate that the computer system 800 is to include all of the components shown in FIG. 11. Rather, the computer system 800 can include any appropriate fewer or additional components not illustrated in FIG. 11 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of analyzing source code, comprising:
receiving, by a processor, an updated version of a computer program, the updated version including a source code;
preprocessing, by a compiler, the source code for a target computing platform, wherein preprocessing the source code by the compiler comprises:
identifying a macro condition associated with one or more computer instructions enclosed by a macro;
determining object code corresponding to the one or more computer instructions based on a current value of the macro condition; and
generating object code and macro information for output to a debugger, the macro information including one or more breakpoint conditions in the macro, wherein the one or more breakpoint conditions are indicated by a macro enclosed level value of the macro information, and the macro enclosed level value is indicative of a level depth of an object code enclosed by the macro.

2. The method of claim 1, further comprising outputting the object code and the macro information to the debugger.

3. The method of claim 2, wherein the debugger validates the object code using the one or more breakpoint conditions.

4. The method of claim 3, wherein the validating includes creating one or more breakpoints by the debugger based on the one or more breakpoint conditions.

5. The method of claim 1, wherein the macro information includes a referred macro name and a current macro value, and the one or more breakpoint conditions are generated at one or more code lines based on the one or more code lines matching the referred macro name and the current macro value.

6. The method of claim 1, wherein the macro enclosed level value is indicated in a macro enclosed level field configured to include a value selected from one of a plurality of level depth values.

7. A system comprising:
a memory device; and
one or more processing units coupled with the memory device, the one or more processing units are configured to perform a method of analyzing source code, the method comprising:
receiving, by a processor, an updated version of a computer program, the updated version including a source code;
preprocessing, by a compiler, the source code for a target computing platform, wherein preprocessing the source code by the compiler comprises:
identifying a macro condition associated with one or more computer instructions enclosed by a macro;
determining object code corresponding to the one or more computer instructions based on a current value of the macro condition; and
generating object code and macro information for output to a debugger, the macro information including one or more breakpoint conditions in the macro, wherein the one or more breakpoint conditions are indicated by a macro enclosed level value of the macro information, and the macro enclosed level value is indicative of a level depth of an object code enclosed by the macro.

8. The system of claim 7, wherein the method further comprises outputting the object code and the macro information to the debugger, wherein the debugger validates the object code using the one or more breakpoint conditions.

9. The system of claim 8, wherein the validating includes creating one or more breakpoints by the debugger based on the one or more breakpoint conditions.

10. The system of claim 7, wherein the macro information includes a referred macro name and a current macro value, and the one or more breakpoint conditions are generated at one or more code lines based on the one or more code lines matching the referred macro name and the current macro value.

11. The system of claim 7, wherein the macro enclosed level value is indicated in a macro enclosed level field configured to include a value selected from one of a plurality of level depth values.

12. A computer program product comprising a computer-readable memory that has
   computer-executable instructions stored thereupon, the computer-executable instructions when executed by a processor cause the processor to perform operations comprising:
      receiving an updated version of a computer program, the updated version including a source code;
      preprocessing, by a compiler, the source code for a target computing platform, wherein preprocessing the source code by the compiler comprises:
         identifying a macro condition associated with one or more computer instructions enclosed by a macro;
         determining object code corresponding to the one or more computer instructions based on a current value of the macro condition; and
      generating object code and macro information for output to a debugger, the macro information including one or more breakpoint conditions in the macro, wherein the one or more breakpoint conditions are indicated by a macro enclosed level value of the macro information, and the macro enclosed level value is indicative of a level depth of an object code enclosed by the macro.

13. The computer program product of claim 12, wherein the operations further comprise outputting the object code and the macro information to a debugger, wherein the debugger validates the object code using the one or more breakpoint conditions and creates one or more breakpoints by the debugger based on the one or more breakpoint conditions.

14. The computer program product of claim 12, wherein the macro information includes a referred macro name and a current macro value, and the one or more breakpoint conditions are generated at one or more code lines based on the one or more code lines matching the referred macro name and the current macro value.

15. The computer program product of claim 12, wherein the macro enclosed level value is indicated in a macro enclosed level field configured to include a value selected from one of a plurality of level depth values.

* * * * *